(12) United States Patent
Dhanabalan et al.

(10) Patent No.: US 9,398,002 B2
(45) Date of Patent: Jul. 19, 2016

(54) SECURE COMMUNICATION DURING PROVISIONING OF A MOBILE DEVICE TO STREAM MEDIA CONTENT FROM A MEDIA CLIENT

(71) Applicant: Verizon Patent and Licensing Inc., Arlington, VA (US)

(72) Inventors: Sankar Ram Dhanabalan, Irving, TX (US); Kishore Tallapaneni, Flower Mound, TX (US); Prabhakar Mani, Coppell, TX (US); Anil Kumar Padi, Flower Mound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 37 days.

(21) Appl. No.: 14/331,617

(22) Filed: Jul. 15, 2014

(65) Prior Publication Data

US 2016/0021098 A1 Jan. 21, 2016

(51) Int. Cl.
*H04L 29/06* (2006.01)
*H04W 12/08* (2009.01)
*H04L 29/08* (2006.01)

(52) U.S. Cl.
CPC ........... *H04L 63/0823* (2013.01); *H04W 12/08* (2013.01); *H04L 63/0815* (2013.01); *H04L 63/168* (2013.01); *H04L 67/02* (2013.01)

(58) Field of Classification Search
CPC ............ H04L 63/0823; H04L 63/0815; H04L 63/0853; H04L 67/02; H04W 12/08; G06F 21/41

USPC ............................................................. 726/8
See application file for complete search history.

(56) References Cited

U.S. PATENT DOCUMENTS

| | | | | |
|---|---|---|---|---|
| 2004/0034776 | A1* | 2/2004 | FernandO | H04L 9/0825 713/171 |
| 2004/0039938 | A1* | 2/2004 | Katz | H04L 63/1458 726/2 |
| 2013/0045681 | A1* | 2/2013 | Dua | G06F 17/30058 455/41.1 |
| 2013/0347073 | A1* | 12/2013 | Bryksa | H04L 63/105 726/4 |

OTHER PUBLICATIONS

Wikipedia, "Streaming media",http://en.wikipedia.org/wiki/streaming_media, Jun. 20, 2014, 8 pages.
Wikipedia, "Set-top Box", http://en.wikipedia.org/wiki/set-top_box, Jul. 9, 2014, 7 pages.

* cited by examiner

*Primary Examiner* — William Goodchild (57) ABSTRACT

A device may be configured to communicate with a mobile device using a short range communication protocol. The device may open a port based on communicating with the mobile device using the short range communication protocol. The device may receive a request from the mobile device via the port. The request may request security information for setting up a secure connection. The device may provide the security information to the mobile device. The device may establish a secure connection with the mobile device based on the security information. The device may provision the mobile device to receive media content from the device based on the secure connection. The device may provide the media content to the mobile device based on provisioning the mobile device.

20 Claims, 11 Drawing Sheets

SECURE COMMUNICATION DURING PROVISIONING OF A MOBILE DEVICE TO STREAM MEDIA CONTENT FROM A MEDIA CLIENT

BACKGROUND

A user may use a mobile device (e.g., a phone, a tablet computer, etc.) to view media content. For example, a user may watch videos stored on the mobile device or use the mobile device to watch videos from the Internet.

DETAILED DESCRIPTION PREFERRED EMBODIMENTS

The following detailed description of example implementations refers to the accompanying drawings. The same reference numbers in different drawings may identify the same or similar elements.

A media client (e.g., a set-top box) may allow a mobile device (e.g., a phone, a tablet computer, etc.) to stream media content from the media client. For example, a service provider may provide a media client that allows a customer to stream media content in the customer's home or outside of the customer's home. However, before the mobile device may stream the media content, the media client may have to provision or set up the mobile device to stream the media content from the media client.

The mobile device and the media client may not be set up for secure communication to provision the mobile device. Accordingly, the media client may keep an unsecure port open at all times to wait for a request from the mobile device to set up a secure connection. The media client and the mobile device may use the unsecure port to exchange information for setting up a secure connection on a secure port. However, keeping the unsecure port open may provide an opportunity for an unauthorized user to attack or hack the media client. Moreover, the secure connection on the secure port may be susceptible to a brute force attack. Thus, the media client may restrict how often data may be received on the secure port to prevent a brute force attack from being successful. However, restricting how often data may be received on the secure port may also cause delays or errors in the provisioning process.

Some implementations described herein may open a port on a media client for a limited amount of time based on the media client and the mobile device communicating using a short range communication protocol (e.g., Radio Frequency Identification (RFID), Near Field Communication (NFC), infrared (IR), Bluetooth, etc.) and/or other communication protocols (e.g., Zigbee, Zwave, etc.). The port may be closed at other times to avoid unauthorized users using an open port to attack the media client. Accordingly, some implementations described herein may allow a media client to provision a mobile device to stream media content from the media client while keeping the media client secure.

Figure 1:
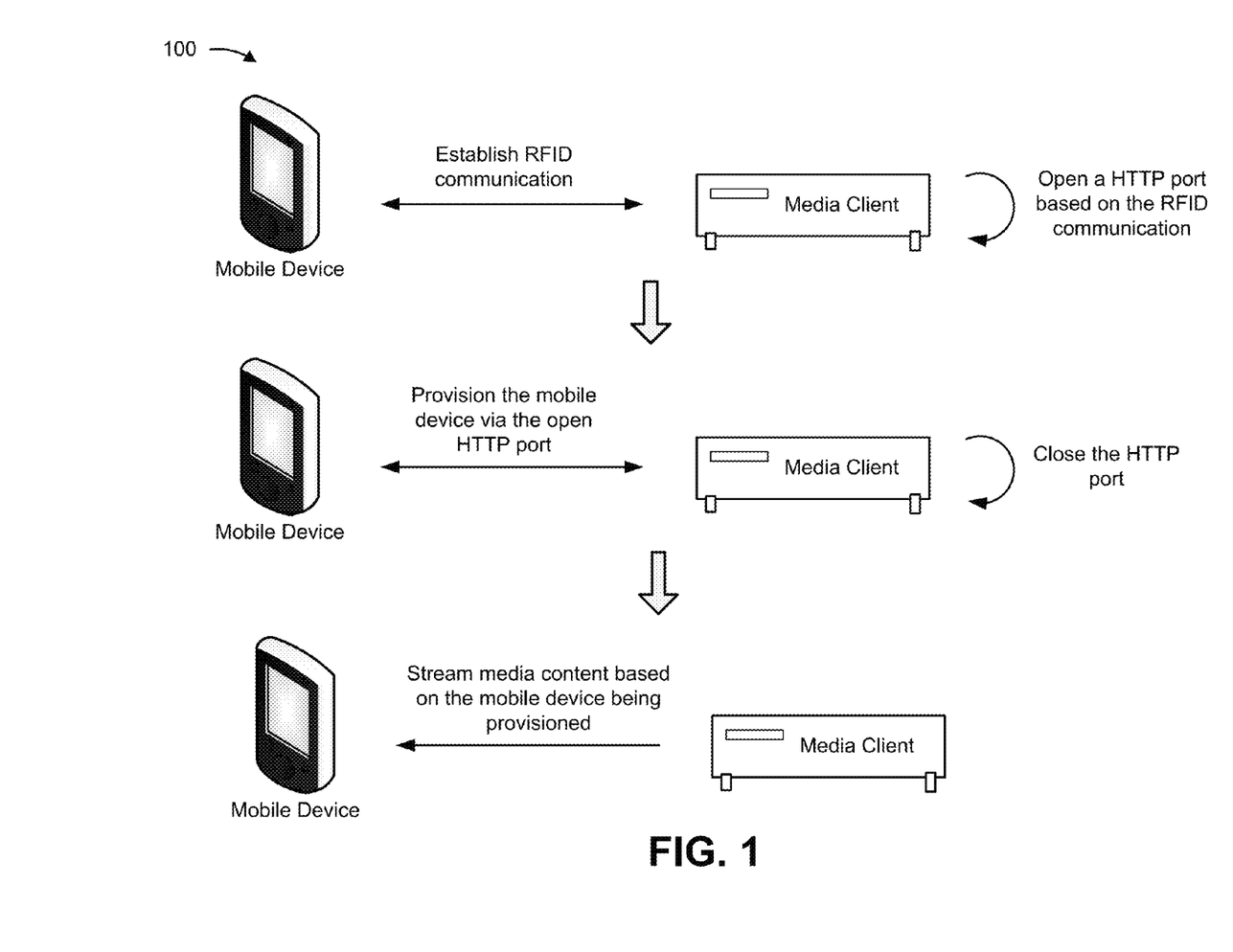
FIG. 1 is a diagram of an overview of an example implementation described herein.

FIG. 1 is a diagram of an overview of an example implementation 100 described herein. In FIG. 1, assume a media client (e.g., a set-top box) includes a Hypertext Transfer Protocol (HTTP) port used to provision a mobile device for streaming media content from the media client, and assume that the HTTP port is closed. Further, assume the media client and the mobile device include a RFID chip (e.g., a NFC chip). Also, assume the user moves the mobile device close enough to the media client for the RFID chips to communicate via a RFID communication (e.g., NFC).

As shown in FIG. 1, the mobile device and the media client may establish the RFID communication using the RFID chips. The media client may open the HTTP port for a limited time based on establishing the RFID communication with the mobile device. In some implementations, the media client may open a random HTTP port and send a port identifier to the mobile device via the RFID communication. The mobile device may receive the port identifier that identifies the open HTTP port.

As further shown in FIG. 1, the mobile device and the media client may communicate via the HTTP port to provision the mobile device. During or after the provisioning, the media client may close the HTTP port. For example, the media client may close the HTTP port until another RFID communication is established.

As further shown in FIG. 1, the mobile device may stream media content (e.g., TV programs, movies, recorded programs, etc.) from the media client based on the mobile device being provisioned.

In this way, the media client may open a HTTP port to provision the mobile device without keeping the HTTP port open at all times and without subjecting the media client to malicious attacks via the open HTTP port.

Figure 2:
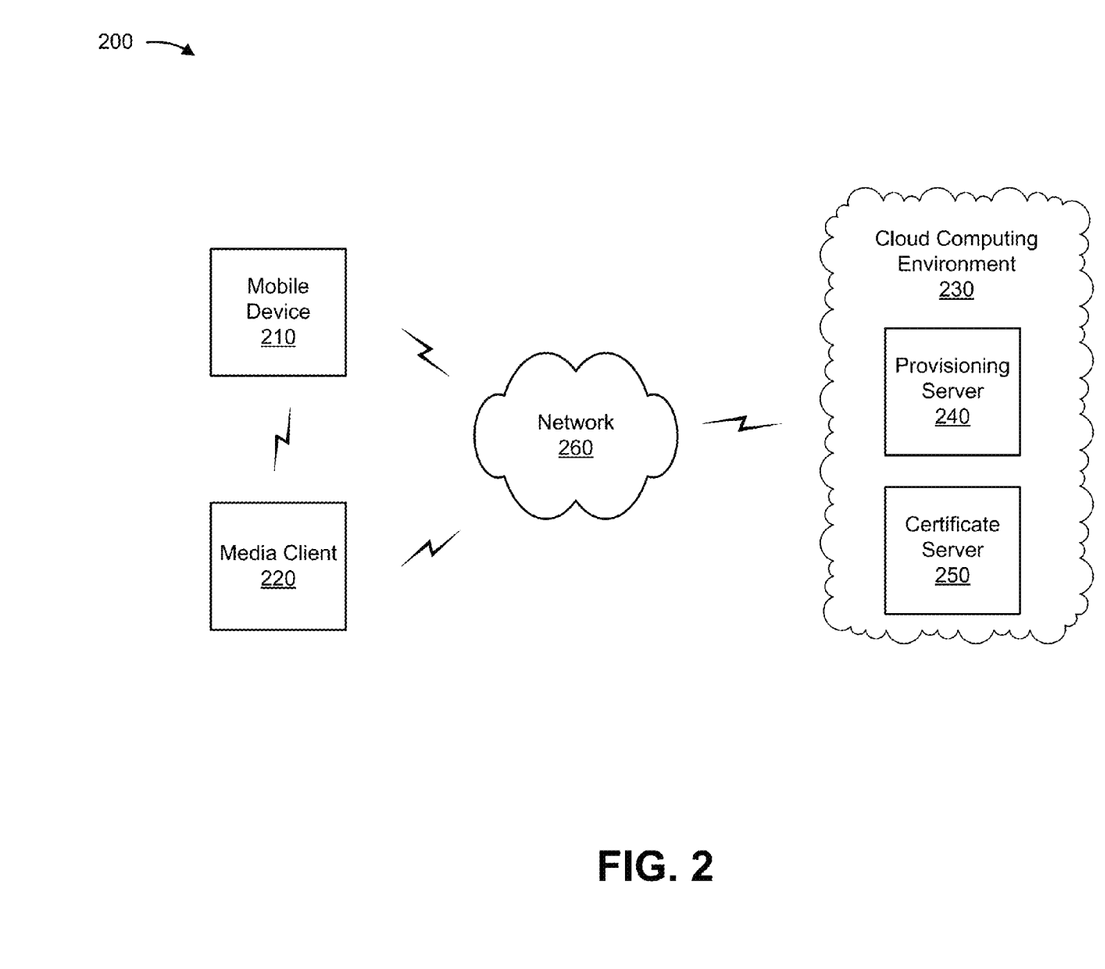
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, a media client 220, a cloud computing environment 230, a provisioning server 240, a certificate server 250, and/or a network 260. Devices of environment 200 may interconnect via wired connections, wireless connections, or a combination of wired and wireless connections.

Mobile device 210 may include a device capable of receiving, processing, and/or providing information. For example, mobile device 210 may include a mobile phone (e.g., a smart phone, a radiotelephone, etc.), a computing device (e.g., a laptop computer, a tablet computer, a handheld computer, a gaming device, etc.), or a similar device. In some implementations, mobile device 210 may include a communication interface that allows mobile device 210 to receive information from and/or transmit information to another device in environment 200. For example, mobile device 210 may include a RFID chip (e.g., a NFC chip) for communicating with media client 220 and/or another device in environment 200. As used herein, the term "mobile RFID chip" may refer to a RFID chip included in mobile device 210.

Media client 220 may include a device capable of receiving, transmitting, and/or processing multimedia content and providing the multimedia content to a user (e.g., via a television or other display device). Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. In some implementations, media client 220 may include a RFID chip (e.g., a NFC chip) for communicating with mobile device 210 and/or another device in environment 200. As used herein, the term "media RFID chip" may refer to a RFID chip included in media client 220.

Cloud computing environment 230 may include an environment that delivers computing as a service, whereby shared resources, services, etc. may be provided to mobile device 210 and/or media client 220. Cloud computing environment 230 may provide computation, software, data access, storage, and/or other services that do not require end-user knowledge of a physical location and configuration of a system and/or a device that delivers the services. As shown, cloud computing environment 230 may include provisioning server 240 and/or certificate server 250.

Provisioning server 240 may include one or more devices capable of storing, processing, and/or routing information. In some implementations, provisioning server 240 may include a communication interface that allows provisioning server 240 to receive information from and/or transmit information to other devices in environment 200. In some implementations, provisioning server 240 may validate mobile device 210 for streaming media content from media client 220.

Certificate server 250 may include one or more devices capable of storing, processing, and/or routing information. In some implementations, certificate server 250 may include a communication interface that allows certificate server 250 to receive information from and/or transmit information to other devices in environment 200. In some implementations, certificate server 250 may issue a device certificate to mobile device 210 for use in provisioning mobile device 210 for streaming media content from media client 220.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
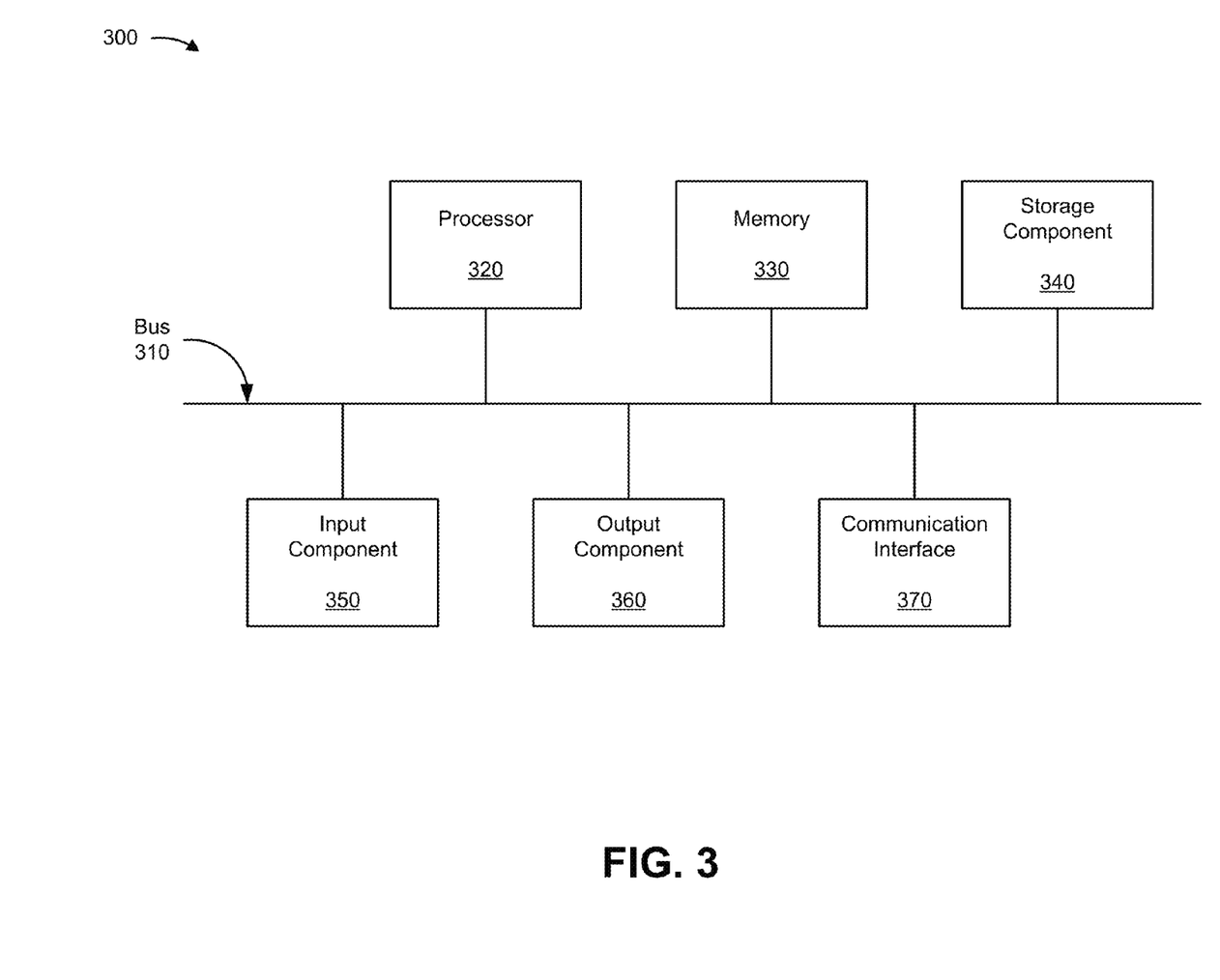
FIG. 3 is a diagram of example components of one or more devices of FIG. 2.

FIG. 3 is a diagram of example components of a device 300. Device 300 may correspond to mobile device 210, media client 220, provisioning server 240, and/or certificate server 250. In some implementations, mobile device 210, media client 220, provisioning server 240, and/or certificate server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface (e.g., RFID, NFC, Bluetooth, etc.), a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
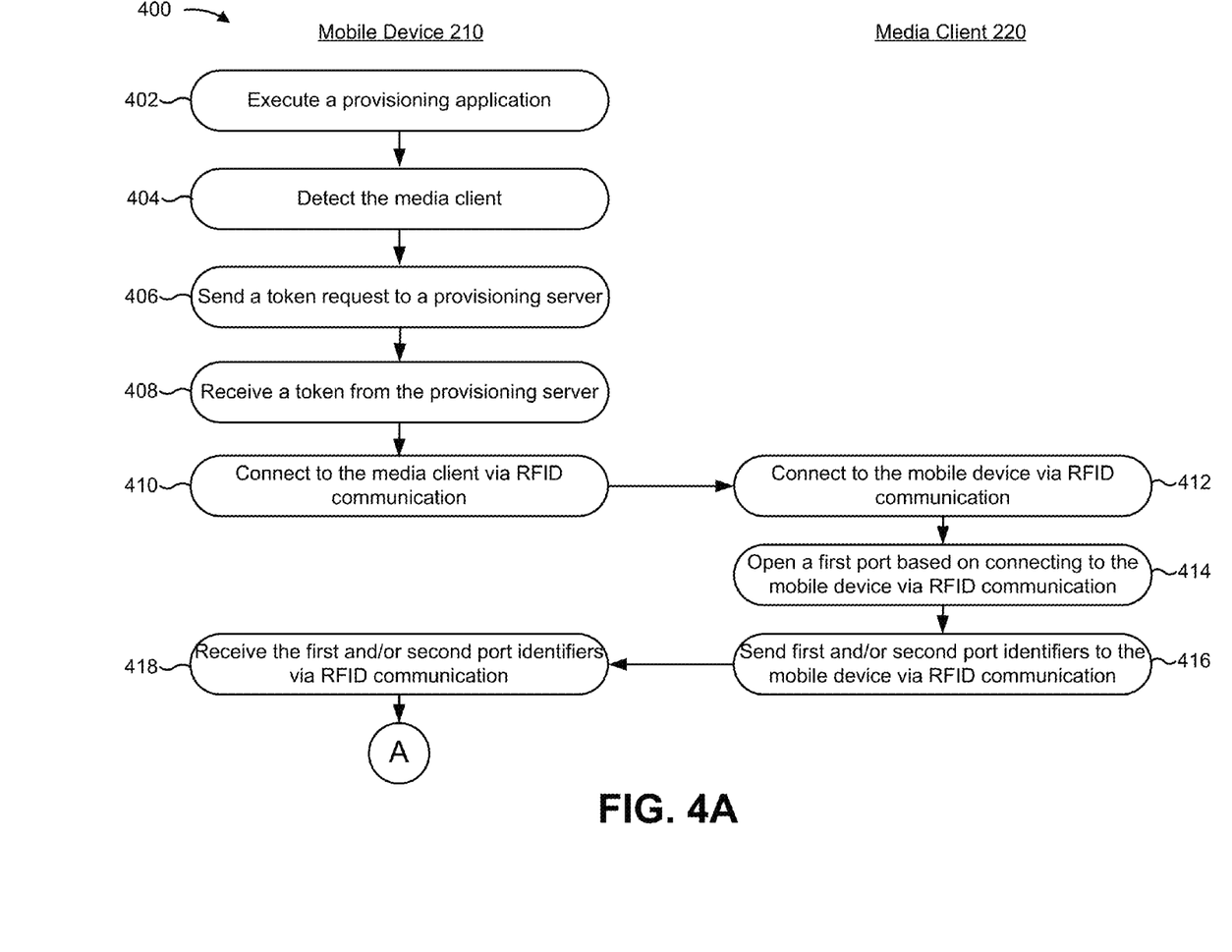
FIGS. 4A-4C are flow charts of an example process for provisioning a mobile device to stream media content from a media client.
Figure 4B:
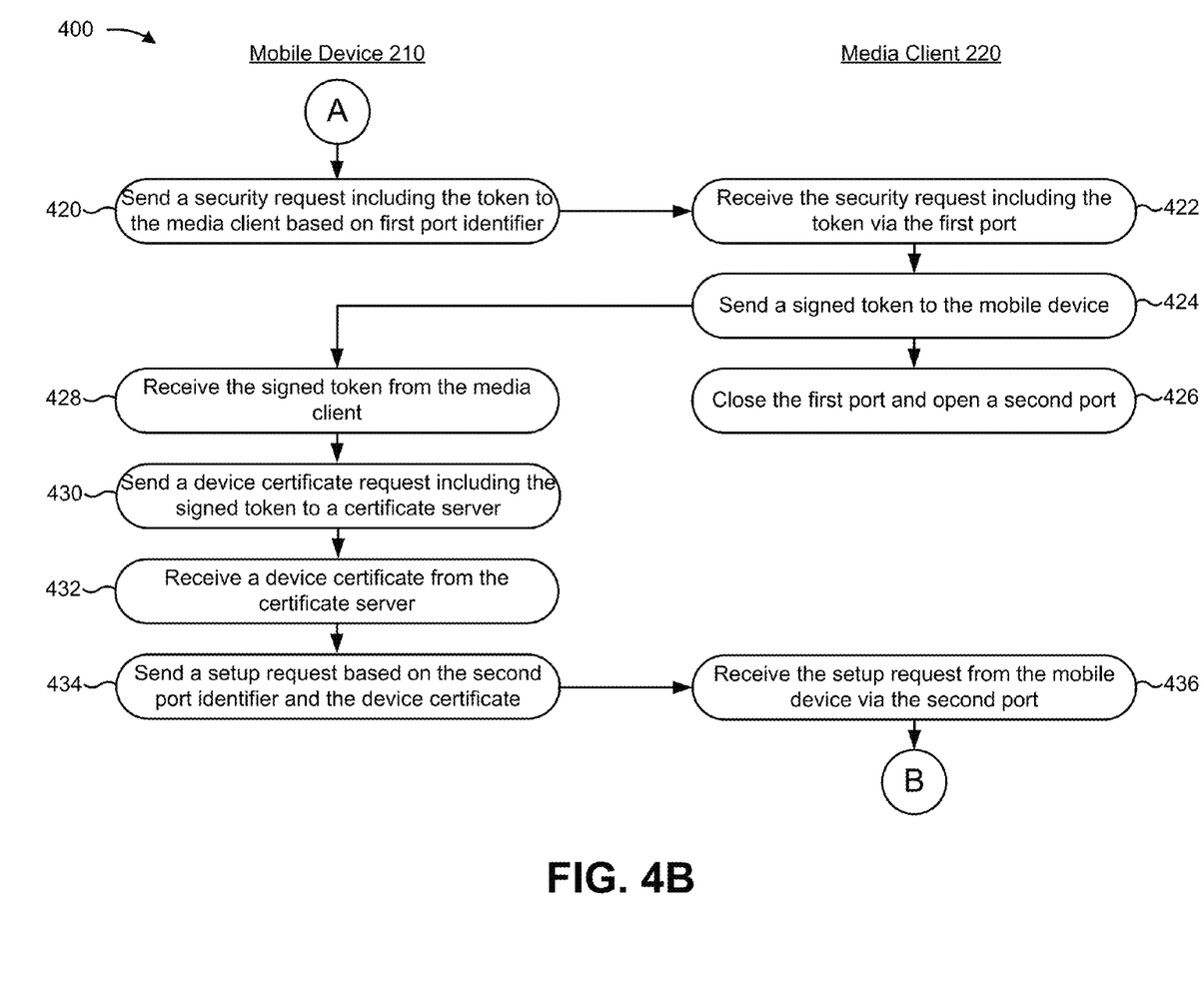
Figure 4C:
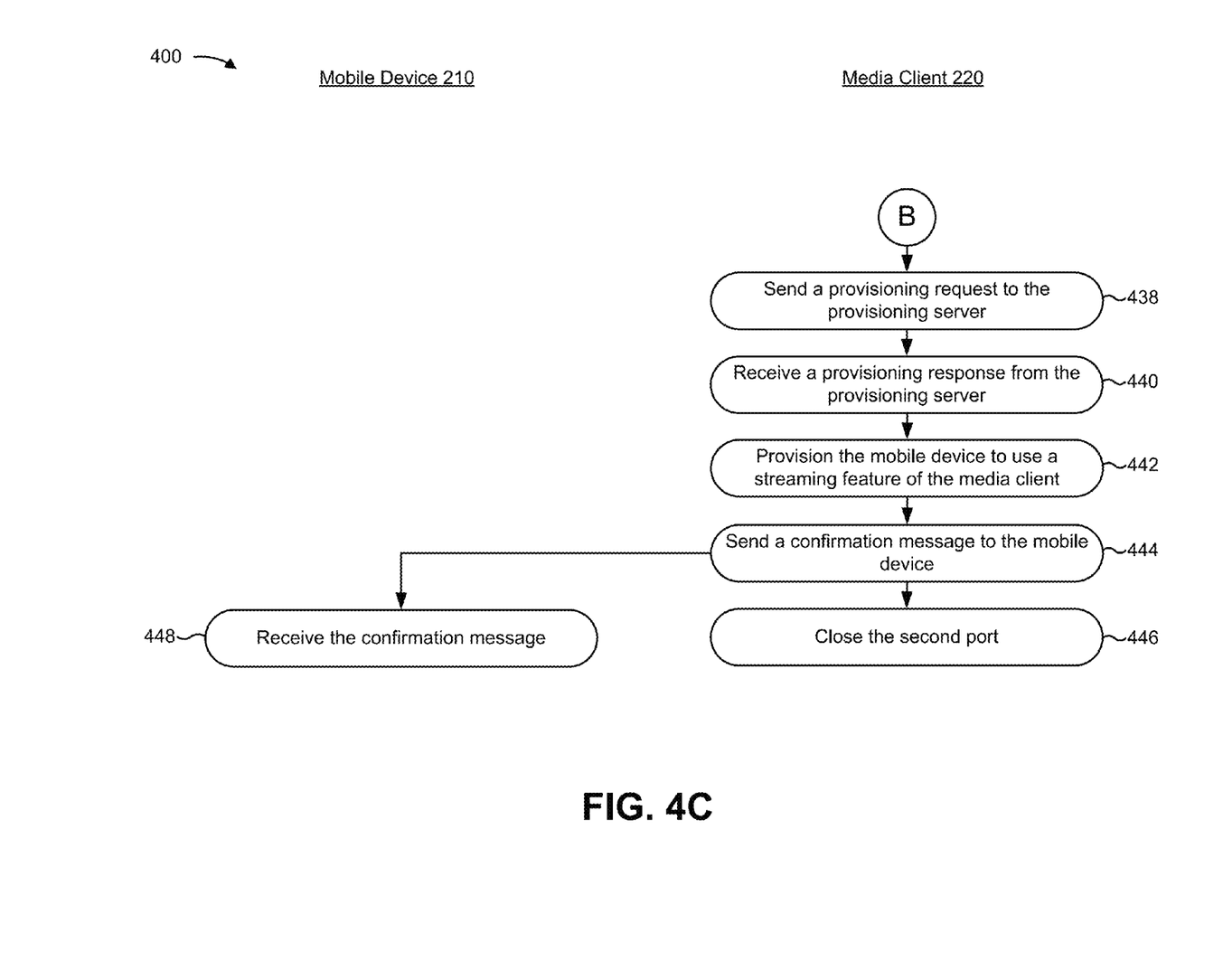

FIGS. 4A-4C are flow charts of an example process 400 for provisioning mobile device 210 to stream media content from media client 220. In some implementations, one or more process blocks of FIGS. 4A-4C may be performed by mobile device 210 and/or media client 220. In some implementations, one or more process blocks of FIGS. 4A-4C may be performed by another device or a group of devices separate from or including mobile device 210 and/or media client 220, such as provisioning server 240 and/or certificate server 250.

As shown in FIG. 4A, process 400 may include executing a provisioning application (block 402). For example, mobile device 210 may execute the provisioning application.

The provisioning application may provision or set up mobile device 210 to use a streaming feature of media client 220. The streaming feature may permit mobile device 210 to stream media content from media client 220 and/or remotely access media client 220. Mobile device 210 may store the provisioning application in a memory included in or accessible by mobile device 210.

In some implementations, mobile device 210 may execute the provisioning application and a user may input login information associated with an account (e.g., a customer account with a service provider that provides media service via media client 220). The login information may include a user identifier (e.g., a user name, a single sign-on (SSO) identifier, an account number, etc.) and/or a passcode (e.g., a password, a personal identification number (PIN), biometric information, etc.).

Mobile device 210 may authenticate the user based on the login information. For example, mobile device 210 may communicate with provisioning server 240 and/or another device in cloud computing environment 230 that manages accounts (e.g., customer accounts) to authenticate the user based on the login information. In some implementations, mobile device 210 may begin provisioning mobile device 210 based on a successful authentication of the login information.

As further shown in FIG. 4A, process 400 may include detecting media client 220 (block 404). For example, mobile device 210 may detect media client 220.

In some implementations, mobile device 210 may detect media client 220 using a direct short range communication protocol (e.g., RFID communication, NFC, Bluetooth, etc.). Additionally, or alternatively, mobile device 210 may detect that media client 220 is connected to a same network (e.g., network 260) as mobile device 210. For example, mobile device 210 may detect media client 220 is connected to a same LAN (e.g., a Wi-Fi network) using a Universal Plug and Play (UPnP) discovery protocol (e.g., Digital Living Network Alliance (DLNA) discovery) or another discovery protocol.

As further shown in FIG. 4A, process 400 may include sending a token request to provisioning server 240 (block 406). For example, mobile device 210 may send the token request to provisioning server 240 based on discovering media client 220.

The token request may request that a token be provided to mobile device 210. The token request may include the login information (e.g., a SSO identifier), a mobile device identifier that uniquely identifies mobile device 210, and/or a mobile device type identifier that identifies a device type of mobile device 210 (e.g., a make and/or a model of mobile device 210, an operating system used by mobile device 210, etc.).

Provisioning server 240 may receive the request and determine whether mobile device 210 is authorized to and/or capable of using the streaming feature of a media client 220 based on the login information and/or the device identifier. Provisioning server 240 may send a token to media client 220 if mobile device 210 is determined to be authorized to and/or capable of using the streaming feature.

As further shown in FIG. 4A, process 400 may include receiving a token from provisioning server 240 (block 408). For example, mobile device 210 may receive the token from provisioning server 240 based on sending the token request.

As further shown in FIG. 4A, process 400 may include connecting to media client 220 via RFID (or other short range) communication (block 410). For example, mobile device 210 may connect to media client 220.

In some implementations, mobile device 210 may use a mobile RFID chip included in mobile device 210 to detect a media RFID chip included in media client 220 and establish RFID communication (e.g., NFC) with media client 220. For example, a user of mobile device 210 may move mobile device 210 close enough to media client 220 to be within range for RFID communication.

In some implementations, mobile device 210 may send provision information to media client 220, via the RFID communication, that indicates mobile device 210 is executing the provisioning application and/or that indicates an instruction to open a port.

As further shown in FIG. 4A, process 400 may include connecting to mobile device 210 via RFID (or other short range) communication (block 412). For example, media client 220 may connect to mobile device 210. In some implementations, mobile device 210 may receive the provision information from mobile device 210 via the RFID communication.

As further shown in FIG. 4A, process 400 may include opening a first port based on connecting to mobile device 210 via RFID (or other short range) communication (block 414). For example, media client 220 may open the first port.

In some implementations, the first port may be a HTTP port associated with a first port identifier (e.g., a port number, a port name, etc.). The first port may be used to receive a security request as will be discussed in more detail later.

In some implementations, media client 220 may keep the first port closed as a default setting and/or when RFID communication has not been established with another device. When closed, the first port may be configured to reject or ignore data packets.

In some implementations, media client 220 may open the first port based on connecting to mobile device 210 via RFID communication (e.g., NFC). For example, media client 220 may open the first port based on the provision information received from media client 220 via RFID communication. Media client 220 may open the first port by configuring the first port to accept data packets. In some implementations, media client 220 may open the first port for a particular amount of time (e.g., one second, five seconds, ten seconds, one minute, etc.) and then close the port when the particular amount of time passes since opening the first port.

In some implementations, the first port may be a fixed port or a default port. In other words, the first port may always have a same port identifier. For example, the first port may be a same port that all mobile devices 210 use to send security requests to media client 220. In some implementations, the provisioning application stored by mobile device 210 may include information identifying a first port identifier for the fixed port.

On the other hand, the first port may a changeable port that may change between different ports. For example, media client 220 may randomly or otherwise determine a port to be the first port, from among multiple available ports, based on RFID communication being established with mobile device 210. In other words, the first port may be associated with a port identifier X a first time the first port is opened, and the first port may be associated with a port identifier Y a second time the first port is opened. The first port being a changeable port may limit an unauthorized user (e.g., a hacker) from accessing media client 220 via the first port because the unauthorized user may not know which port is open at any given time.

As further shown in FIG. 4A, process 400 may include sending a first port identifier and/or a second port identifier to mobile device 210 via RFID (or other short range) communication (block 416). For example, media client 220 may send the first port identifier and/or the second port identifier to mobile device 210.

The first port identifier may identify the first port that is open and ready to receive the security request.

The second port identifier may identify a second port used to receive a setup request (as will be discussed in more detail later). In some implementations, the second port may be a Hypertext Transfer Protocol Secure (HTTPS) port associated with a second port identifier (e.g., a port number, a port name, etc.).

In some implementations, the second port may be a fixed port that may not change between different ports. For example, the second port may be a same port that all mobile devices 210 use to send setup requests to media client 220. In some implementations, the provisioning application stored by mobile device 210 may include information identifying a second port identifier for the fixed port. On the other hand, the second port may a changeable port that may change between different ports. For example, media client 220 may randomly or otherwise determine a port to be the second port based on RFID communication being established with mobile device 210.

In some implementations, the first port and the second port may be different ports. Alternatively, the first port and the second port may be a same port.

In some implementations, media client 220 may not send the first port identifier and/or the second port identifier to mobile device 210. For example, if the first port identifier and/or second port identifier are fixed ports, then mobile device 210 may already store information indicating the first port identifier and/or the second port identifier.

As further shown in FIG. 4A, process 400 may include receiving the first port identifier and/or the second port identifier via RFID communication (block 418). For example, mobile device 210 may receive the first port identifier and/or the second port identifier from media client 220.

As shown in FIG. 4B, process 400 may include sending a security request, including the token, to media client 220 based on the first port identifier (block 420). For example, mobile device 210 may send the security request to media client 220 via the first port.

In some implementations, the request may include the token received from provisioning server 240 and request that media client 220 provide security information (e.g., a signed token) to be used to set up a secure connection.

As further shown in FIG. 4B, process 400 may include receiving the security request, including the token, via the first port (block 422). For example, media client 220 may receive the security request from mobile device 210.

As further shown in FIG. 4B, process 400 may include sending a signed token to mobile device 210 (block 424). For example, media client 220 may sign the token and send the signed token to mobile device 210 based on the security request. In some implementations, media client 220 may sign the token by attaching a time-of-day, encrypted with a private key, to the token.

As further shown in FIG. 4B, process 400 may include closing the first port and opening a second port (block 426). For example, media client 220 may close the first port and open the second port.

In some implementations, media client 220 may close the first port based on receiving the security request via the first port and/or sending the signed token. Additionally, or alternatively, media client 220 may close the first port based on the particular amount of time passing since the first port was opened, even if a security request was not received while the first port was open. Keeping the first port open for a limited amount of time may reduce the risk that an unauthorized user may use the first port to access or attack media client 220.

In some implementations, media client 220 may open the second port based on connecting to mobile device 210 via RFID communication, and/or receiving the security request. In some implementations, media client 220 may open the second port at a same time as the first port is opened. Alternatively, the second port may be opened after the first port is opened and/or after the first port is closed. For example, media client 220 may open the second port after receiving the security request. In some implementations, media client 220 may close the second port after a particular amount of time passes since opening the second port.

In some implementations, rather than media client 220 sending the second port identifier to mobile device 210 before the security request is received (e.g., at block 416), media client 220 may send the second identifier to mobile device 210, via RFID communication, after the security request is received and/or the second port is opened. In some implementations, the second port may always be open.

As further shown in FIG. 4B, process 400 may include receiving the signed token from media client 220 (block 428). For example, mobile device 210 may receive the signed token from media client 220.

As further shown in FIG. 4B, process 400 may include sending a device certificate request, including the signed token, to certificate server 250 (block 430). For example, mobile device 210 may send the device certificate request to certificate server 250.

The device certificate request may request that certificate server 250 provide a device certificate to mobile device 210. The device certificate request may include the signed token, a mobile device identifier that uniquely identifies mobile device 210 (e.g., a phone number, an IP address, an international mobile subscriber identity (IMSI), an international mobile station equipment identify (IMEI), a mobile equipment identifier (MEID), etc.), and/or a mobile device type identifier that identifies a device type of mobile device 210.

Certificate server 250 may receive the device certificate request and generate a device certificate based on the signed token, the mobile device identifier, and/or the mobile device type identifier. The device certificate may include a Secure Sockets Layer (SSL) certificate and/or a Digital Transmission Content Protection (DTCP) certificate. Additionally, or alternatively, the device certificate may be associated with a device certificate identifier that identifies the device certificate. Certificate server 250 may send the device certificate to mobile device 210.

As further shown in FIG. 4B, process 400 may include receiving the device certificate from certificate server 250 (block 432). For example, mobile device 210 may receive the device certificate from certificate server 250.

As further shown in FIG. 4B, process 400 may include sending a setup request to media client 220 based on the second port identifier and the device certificate (block 434). For example, mobile device 210 may send the setup request to media client 220 via the second port. In some implementations, the second port may be a HTTPS port and mobile device 210 may use the device certificate to establish secure communication with media client 220 via the HTTPS port.

The setup request may request that mobile device 210 be provisioned to use the streaming feature of media client 220. The setup request may include the user identifier (e.g., a SSO identifier), the device certificate identifier, the mobile device identifier, and/or the mobile device type identifier.

As further shown in FIG. 4B, process 400 may include receiving the setup request from mobile device 210 via the second port (block 436). For example, media client 220 may receive the setup request from mobile device 210 via the second port.

As shown in FIG. 4C, process 400 may include sending a provisioning request to provisioning server 240 (block 438). For example, media client 220 may send the provisioning request to provisioning server 240 based on the setup request received from mobile device 210.

The provisioning request may request that provisioning server 240 grant permission for media client 220 to allow mobile device 210 to use the streaming feature of media client 220. The provisioning request may include a media client identifier that uniquely identifies media client 220, the mobile device identifier, the mobile device type identifier, the device certificate identifier, and/or the user identifier (e.g., the SSO identifier).

Provisioning server 240 may receive the provisioning request sent by media client 220 and confirm whether the media client 220 may be allowed to use the streaming feature of media client 220 based on the media client identifier, the mobile device identifier, the mobile device type identifier, the device certificate identifier, and/or the user identifier. For example, provisioning server 240 may confirm that the user identifier and the media client identifier are associated with a same account. Additionally, or alternatively, provisioning server 240 may confirm that the mobile device identifier and/or the mobile device type identifier indicate that mobile device 210 is capable of using the streaming feature. Provisioning server 240 may send a provisioning response to media client 220 that indicates whether media client 220 may be allowed to use the streaming feature of media client 220.

As further shown in FIG. 4C, process 400 may include receiving the provisioning response from provisioning server 240 (block 440). For example, media client 220 may receive the provisioning response from provisioning server 240.

As further shown in FIG. 4C, process 400 may include provisioning mobile device 210 to use the streaming feature of media client 220 (block 442). For example, media client 220 may provision mobile device 210 to use the streaming feature based on the provisioning response.

If the provisioning response indicates mobile device 210 may be permitted to use the streaming feature of media client 220, media client 220 may provision mobile device 210 by adding the mobile device identifier for mobile device 210 to a registered device data structure stored by media client 220. The registered device data structure may include mobile device identifiers that indicate mobile devices 210 that are authorized to use the streaming feature of media client 220. Furthermore, the registered device data structure may associate a certificate identifier with each mobile device identifier.

Mobile device 210 may use the streaming feature of media client 220 at any time once provisioned. In other words, the provisioning process may be a one-time process that allows mobile device 210 to stream media content at any time in the future, and does not need to be repeated each time mobile device 210 streams media content from media client 220.

On the other hand, if the provisioning response indicates mobile device 210 may not be permitted to use the streaming feature of media client 220, media client 220 may not provision mobile device 210.

As further shown in FIG. 4C, process 400 may include sending a confirmation message to mobile device 210 (block 444). For example, media client 220 may send the confirmation message to mobile device 210. The confirmation message may indicate whether mobile device 210 has been provisioned to use the streaming feature of media client 220.

As shown in FIG. 4C, process 400 may include closing the second port (block 446). For example, media client 220 may close the second port based on receiving the setup request from mobile device 210 and/or sending the confirmation message. For example, media client 220 may close the second port based on receiving the setup request at block 436. Additionally, or alternatively, media client 220 may close the second port based on sending the confirmation message at block 444.

Additionally, or alternatively, media client 220 may close the second port based on the particular amount of time passing since the second port was opened, even if a setup request was not received while the second port was open.

Keeping the second port open for a limited amount of time may reduce the risk that an unauthorized user may successfully perform a brute-force attack on media client 220 via the second port without having to restrict how often provisioning requests may be received via the second port. Thus, a delay caused by restricting how often provisioning requests may be received can be avoided.

In some implementations, media client 220 may not close the second port and may always leave the second port open.

As further shown in FIG. 4C, process 400 may include receiving the confirmation message (block 448). For example, mobile device 210 may receive the confirmation message from media client 220 and store information indicating whether mobile device 210 is permitted to use the streaming feature of media client 220.

If mobile device 210 is permitted to use the streaming function (e.g., mobile device 210 has been provisioned by media client 220), mobile device 210 may stream media content (e.g., television shows, movies, recorded content, etc.) from media client 220. In other words, mobile device 210 may send a request to media client 220 to provide the media content. The request may include the client device identifier. Media client 220 may receive the request and validate that mobile device 210 is authorized to stream the media content by comparing the mobile device identifier with the registered device data structure. Assuming mobile device 210 is authorized to stream the media content, media client 220 may obtain the media content (e.g., via a tuner and/or from a memory included in or accessible to media client 220) and send the media content to mobile device 210 in a streaming manner. Mobile device 210 may receive the media content and present the media content to a user of mobile device 210.

If mobile device 210 is not permitted to use the streaming function (e.g., mobile device 210 has not been provisioned by media client 220), mobile device 210 may display a notification to a user, indicating that the attempt to stream media content from media client 220 has failed.

Although FIGS. 4A-4C show example blocks of process 400, in some implementations, process 400 may include additional blocks, fewer blocks, different blocks, or differently arranged blocks than those depicted in FIGS. 4A-4C. Additionally, or alternatively, two or more of the blocks of process 400 may be performed in parallel.

FIGS. 5A-5E are diagrams of an example implementation 500 relating to example process 400 shown in FIGS. 4A-4C. FIGS. 5A-5E show an example of provisioning mobile device 210 to stream media content from media client 220.

Figure 5A:
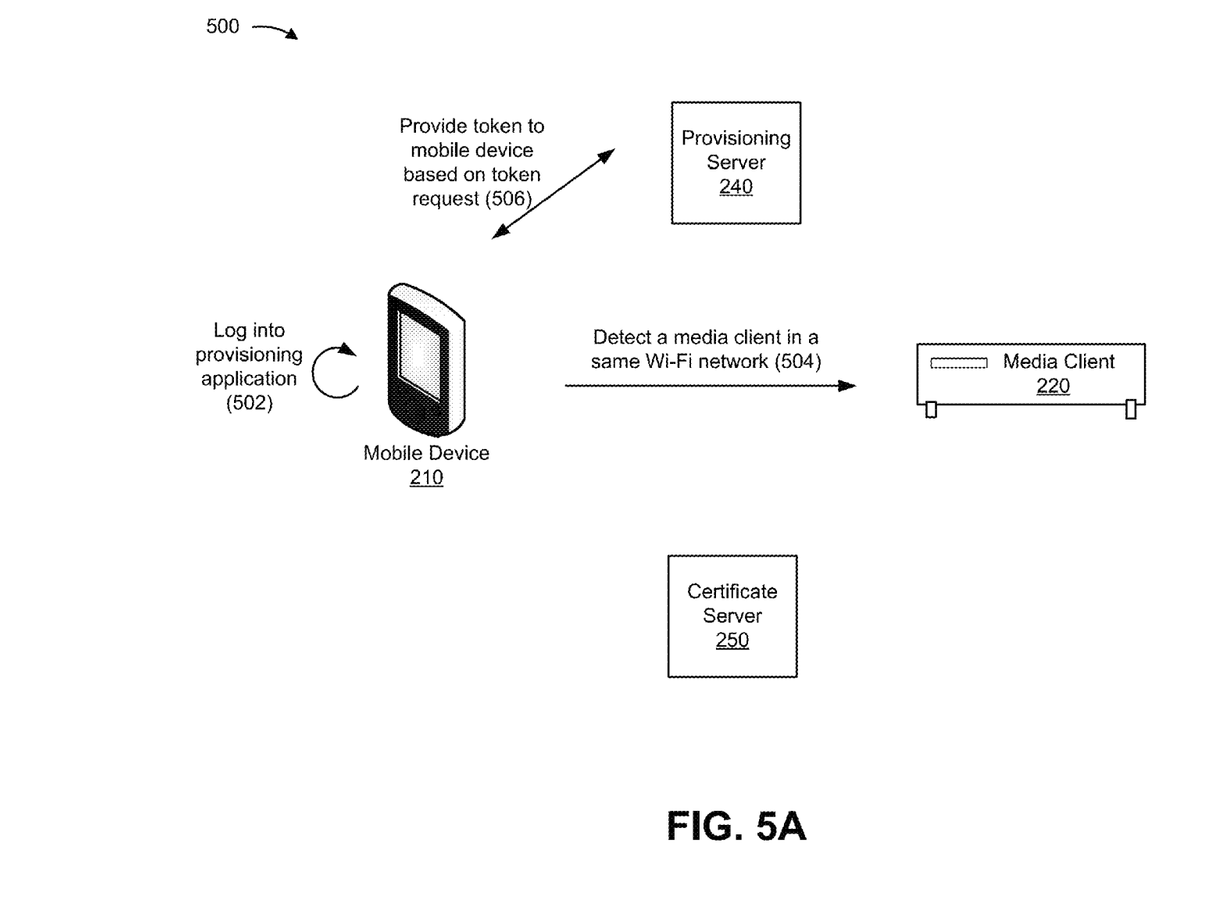
FIGS. 5A-5E are diagrams of an example implementation relating to the example process shown in FIGS. 4A-4C.

As shown in FIG. 5A, a user may log into a provisioning application executed by mobile device 210 (step 502). Assume mobile device 210 is connected to a Wi-Fi network and that the provisioning application causes mobile device 210 to search for a media client 220 connected to the Wi-Fi network.

As further shown in FIG. 5A, the mobile device 210 may detect media client 220 is connected to the Wi-Fi network (step 504). Based on detecting media client 220, mobile device 210 may send a token request to provisioning server 240 and provisioning server 240 may send a token back to mobile device 210 based on the token request (step 506).

Figure 5B:
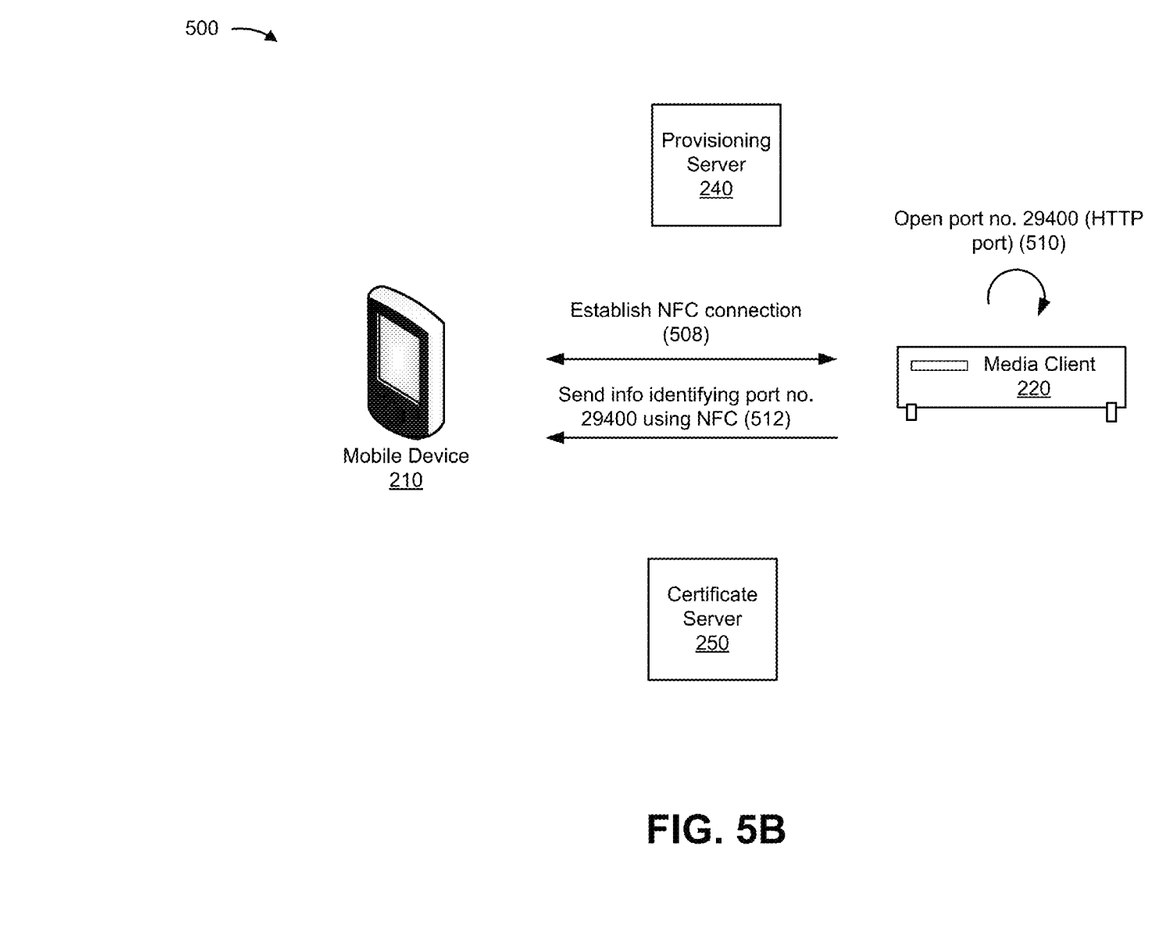

In FIG. 5B, assume mobile device 210 and media client 220 each include a NFC chip for communicating via NFC. A user may move mobile device 210 close enough to media client 220 to establish a NFC connection and mobile device 210 and media client 220 may establish the establish the NFC connection (step 508). Assume media client 220 randomly determines to open an unsecured HTTP port (e.g., port no. 29400) based on establishing the NFC connection with mobile device 210.

As further show in FIG. 5B, media client 220 may open the unsecured HTTP port (e.g., port no. 29400) based on establishing the NFC connection (block 510). Media client 220 may send information identifying port no. 29400 is open to mobile device 210 via the NFC connection and mobile device 210 may receive the information identifying port no. 29400 is open (step 512).

Figure 5C:
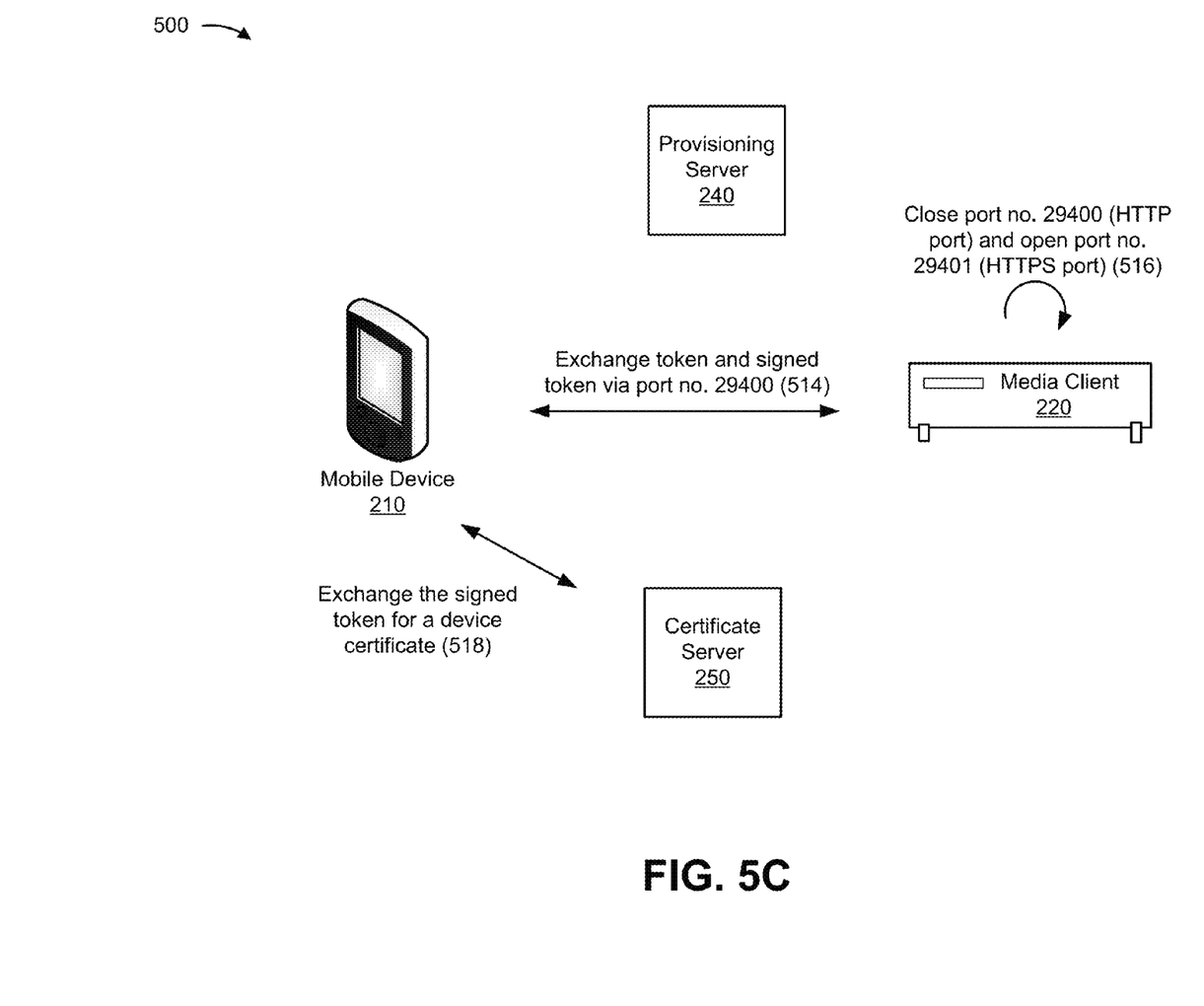

As shown in FIG. 5C, mobile device 210 may send a security request, which includes the token, to media client 220 via port no. 29400. Media client 220 may sign the token and send the signed token to mobile device 210 (step 514). Media client 220 may further close port no. 29400 based on sending the signed token and open port no. 29401 (step 516). Port no. 29401 may be a fixed HTTPS port that is used to receive provisioning requests. Assume the provisioning application installed on mobile device 210 stores information identifying port no. 29401 should be used to send a provisioning request.

As further shown in FIG. 5C, mobile device 210 may send a certificate request, which includes the signed token, to certificate server 250 and certificate server 250 may send a certificate to mobile device 210 based on the signed token (step 518).

Figure 5D:
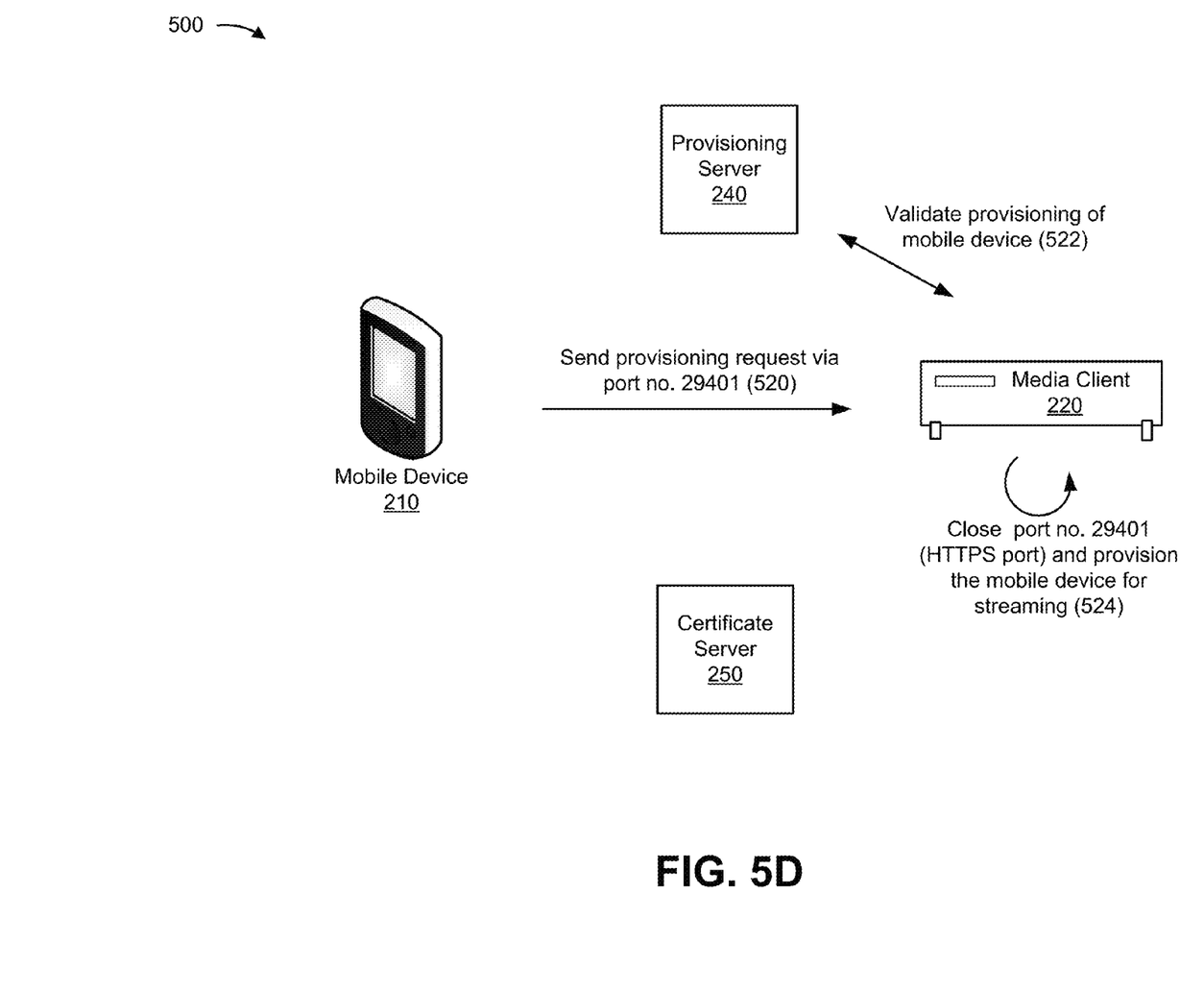

As shown in FIG. 5D, mobile device 210 may send a provisioning request via port no 29401 based on the certificate (step 520). The provisioning request may include a mobile device identifier that identifies mobile device 210. Media client 220 may receive the provisioning request via port no. 29401 and validate that provisioning of mobile device 522 is permitted with provisioning server 240 (step 522). Assume provisioning server 240 sends media client 220 information indicating that provisioning of mobile device 210 is permitted.

As further shown in FIG. 5D, mobile device 210 may close port no. 29401 and provision mobile device 210 for streaming media content from media client 220 (step 524). For example, media client 220 may provision mobile device 210 by adding the mobile device identifier for mobile device 210 to a registered device data structure stored by media client 220.

Figure 5E:
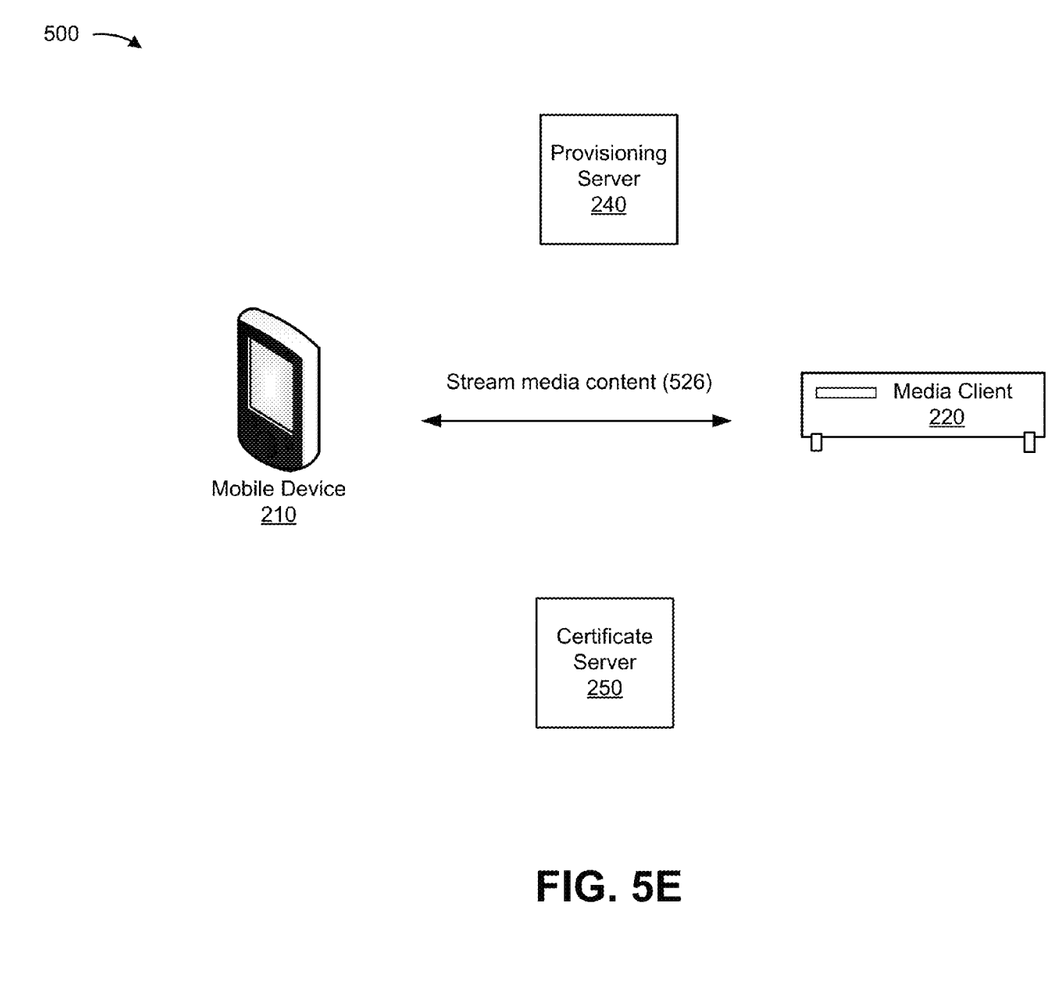

As shown in FIG. 5E, mobile device 210 may stream media content from media client 220 based on mobile device 210 being provisioned (step 526).

As indicated above, FIGS. 5A-5E are provided merely as an example. Other examples are possible and may differ from what was described with regard to FIGS. 5A-5E.

Some implementations described herein may open a port on a media client for a limited amount of time based on RFID communication (e.g., NFC) being established between the media client and a mobile device. The port may be closed at other times to avoid unauthorized users using an open port to attack the media client. Accordingly, some implementations described herein may allow a media client to provision a mobile device to stream media content from the media client while keeping the media client secure.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
communicate with a mobile device using a short range communication protocol;
open a first port, associated with a first communication protocol, after communicating with the mobile device using the short range communication protocol;
receive a request from the mobile device via the first port,
the request requesting security information for setting up a secure connection;
provide the security information to the mobile device;
establish, via a second port and using a second communication protocol, a secure connection with the mobile device based on the security information;
provision the mobile device to receive media content from the device based on the secure connection; and
provide the media content to the mobile device based on provisioning the mobile device.

2. The device of claim 1, where the one or more processors are further to:
close the first port based on providing the security information to the mobile device.

3. The device of claim 1, where the one or more processors are further to:
close the first port based a particular amount of time passing since the first port was opened.

4. The device of claim 1, where the short range communication protocol includes Near Field Communication (NFC).

5. The device of claim 1, where the one or more processors are further to:
randomly determine the first port to open from among a plurality of ports capable of receiving the request from the mobile device,
the plurality of ports including the first port; and
where the one or more processors, when opening the first port, are to:
open the port that is randomly determined.

6. The device of claim 1, where the first port is a Hypertext Transfer Protocol (HTTP) port.

7. The device of claim 1, where the one or more processors are further to:
send information identifying the first port to the mobile device using the short range communication protocol.

8. A computer-readable medium storing instructions, the instructions comprising:
one or more instructions that, when executed by one or more processors of a device, cause the one or more processors to:
connect to a mobile device via radio frequency identification (RFID) communication;
open a first port, associated with a first communication protocol, after communicating with the mobile device via the RFID communication;
receive a first request from the mobile device via the first port,
the first request requesting security information for setting up a secure connection;
provide the security information to the mobile device;
close the first port;
receive a second request from the mobile device via a secure connection on a second port associated with a second communication protocol,
the first port being separate from the second port,
the secure connection being established based on the security information,
the second request requesting the mobile device be provisioned to stream media content from the device;
provision the mobile device to stream media content from the device based on the second request; and
stream the media content to the mobile device based on provisioning the mobile device.

9. The computer-readable medium of claim 8, where the one or more instructions, when executed by the one or more processors, further cause the one or more processors to:
open the second port after connecting to the mobile device via the RFID communication.

10. The computer-readable medium of claim 9, where the one or more instructions, when executed by the one or more processors, further cause the one or more processors to:
close the second port based on a particular amount of time passing since opening the second port.

11. The computer-readable medium of claim 8, where the one or more instructions, when executed by the one or more processors, further cause the one or more processors to:
close the second port based on receiving the second request.

12. The computer-readable medium of claim 8, where the second port is a Hypertext Transfer Protocol Secure (HTTPS) port.

13. The computer-readable medium of claim 8, where the one or more instructions, when executed by the one or more processors, further cause the one or more processors to:
send information identifying the first port and the second port to the mobile device via the RFID communication.

14. The computer-readable medium of claim 8, where the one or more instructions, when executed by the one or more processors, further cause the one or more processors to:
determine the second port from among a plurality of closed ports capable of receiving the second request from the mobile device,
the plurality of closed ports including the second port; and
open the second port based on receiving the first request.

15. A method, comprising:
communicating, by a mobile device, with a media client device using a short range communication protocol,
the media client device opening a first port after communicating using the short range communication protocol,
the first port being associated with a first communication protocol;
sending, by the mobile device, a first request to the media client device via the first port,
the first request requesting security information for setting up a secure connection;
receiving, by the mobile device, the security information from the media client device;
establishing, by the mobile device and via a second port, a secure connection with the media client device based on the security information, the second port being associated with a second communication protocol;

sending, by the mobile device, a second request to the media client device via the secure connection, the second request causing the media client to provision the mobile device to receive media content from the media client device; and receiving, by the mobile device, the media content from the media client device based on the mobile device being provisioned by the media client device.

16. The method of claim 15, further comprising:

receiving a port identifier, from the media client device, using the short range communication protocol, the port identifier identifying the first port; and where sending the first request to the media client device via the first port includes sending the first request based on the port identifier received from the media client device.

17. The method of claim 15, further comprising:

causing the media client device to open the second port after communicating using the short range communication protocol, the first port being separate from the second port; and where sending the second request to the media client device via the secure connection includes sending the second request to the media client device via the second port.

18. The method of claim 17, further comprising:

receiving a port identifier, from the media client device, using the short range communication protocol, the port identifier identifying the second port; and where sending the second request to the media client device via the second port includes sending the second request to the media client device based on the port identifier received from the media client device.

19. The method of claim 15, further comprising:

storing a port identifier that identifies the first port; and where sending the first request to the media client device via the first port includes sending the first request based on the port identifier.

20. The method of claim 15, further comprising:

sending an instruction to the media client device, using the short range communication protocol, to open the first port, the instruction causing the media client to open the first port.

* * * * *